(12) United States Patent
Keller et al.

(10) Patent No.: US 11,065,942 B2
(45) Date of Patent: Jul. 20, 2021

(54) ENVIRONMENTAL AIR CLEANING DEVICE, ROAD VEHICLE HAVING ENVIRONMENTAL AIR CLEANING DEVICE, AND FILTER ELEMENT

(71) Applicant: MANN+HUMMEL GmbH, Ludwigsburg (DE)

(72) Inventors: Florian Keller, Ludwigsburg (DE); Andreas Pelz, Kornwestheim (DE); Gunnar-Marcel Klein, Oberstenfeld (DE); Thomas Loehl, Mundelsheim (DE); Thilo Mueller, Mundelsheim (DE); Christoph Schulz, Stuttgart (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/514,268

(22) Filed: Jul. 17, 2019

(65) Prior Publication Data
US 2019/0336899 A1     Nov. 7, 2019

Related U.S. Application Data

(63) Continuation of application No. PCT/EP2018/051227, filed on Jan. 18, 2018.

(30) Foreign Application Priority Data

Jan. 18, 2017  (DE) .......................... 102017000412.9
May 22, 2017  (DE) .......................... 102017004864.9
Jul. 19, 2017  (DE) .......................... 102017006794.5

(51) Int. Cl.
*B62D 27/02* (2006.01)
*B60H 3/06* (2006.01)
(Continued)

(52) U.S. Cl.
CPC ......... *B60H 3/0658* (2013.01); *B01D 46/001* (2013.01); *B01D 46/003* (2013.01);
(Continued)

(58) Field of Classification Search
CPC .............. B01D 46/0006; B01D 46/001; B01D 46/0026; B01D 46/003; B01D 46/0043;
(Continued)

(56) References Cited

U.S. PATENT DOCUMENTS 4,208,197 A * 6/1980 Yakimowich .......... B01D 50/00
 296/180.2
4,630,530 A * 12/1986 Eckstrom ........... B60H 1/00371
 4/209 FF
(Continued)

FOREIGN PATENT DOCUMENTS

DE     10329961 A1    1/2005
DE  202005005673 U1    9/2005
(Continued)

*Primary Examiner* — Minh Chau T Pham
(74) *Attorney, Agent, or Firm* — James Hasselbeck

(57) ABSTRACT

An environmental air cleaning device for a road vehicle removes dust, particulate matter, and/or gases from environmental air. The environmental air cleaning device has one or more filter elements. The environmental air cleaning device is provided with a mounting device that rigidly couples to a vehicle-side mounting device for roof loads. A road vehicle with such an environmental air cleaning device is provided.

23 Claims, 9 Drawing Sheets

(51) Int. Cl.
  *B60H 1/00* (2006.01)
  *B01D 46/00* (2006.01)
  *B01D 46/02* (2006.01)
  *B01D 46/52* (2006.01)
  *B62D 21/15* (2006.01)

(52) U.S. Cl.
  CPC ..... *B01D 46/0006* (2013.01); *B01D 46/0026* (2013.01); *B01D 46/0043* (2013.01); *B01D 46/023* (2013.01); *B01D 46/522* (2013.01); *B01D 46/523* (2013.01); *B60H 1/00271* (2013.01); *B60H 3/0641* (2013.01); *B62D 21/155* (2013.01); *B62D 27/02* (2013.01); *B01D 2273/30* (2013.01); *B01D 2279/40* (2013.01); *B60H 1/00521* (2013.01); *B60H 2003/0683* (2013.01)

(58) Field of Classification Search
  CPC .. B01D 46/023; B01D 46/422; B01D 46/523; B01D 2273/30; B01D 2279/40; B60H 3/0658; B60H 3/0641; B60H 1/00521; B60H 2003/0683; B60H 3/0608; B62D 21/155; B62D 27/02; F24F 13/0272; F24F 2003/1657; F24F 2221/12; Y02A 50/2351
  USPC ...... 55/385.3, 385.2, 515, 516, 418; 454/69, 454/83, 156, 370
  See application file for complete search history.

(56) References Cited

U.S. PATENT DOCUMENTS

| | | | |
|---|---|---|---|
| 5,147,429 A * | 9/1992 | Bartholomew | B01D 46/42 244/30 |
| 5,358,442 A * | 10/1994 | Ekinci | B60H 1/262 454/143 |
| 5,509,853 A * | 4/1996 | Wells | B01D 46/0052 454/370 |
| 5,676,913 A * | 10/1997 | Cirillo | B01D 46/0052 423/219 |
| 6,773,493 B2 * | 8/2004 | Lindstrom | A61B 5/097 422/88 |
| 7,976,618 B2 * | 7/2011 | Geurtz | B01J 20/28057 96/131 |
| 8,709,139 B2 * | 4/2014 | Veeser | B32B 5/26 96/66 |
| 8,871,084 B2 * | 10/2014 | Eberle | F02M 37/32 210/86 |
| 8,920,537 B2 * | 12/2014 | Seike | B03C 3/017 95/3 |
| 9,308,484 B1 | 4/2016 | Harper | |
| 10,493,391 B2 * | 12/2019 | Luley | B01D 46/10 |
| 2005/0000197 A1 * | 1/2005 | Krantz | F16D 65/0031 55/385.3 |
| 2006/0107636 A1 * | 5/2006 | Gage | B01D 46/0023 55/385.3 |
| 2007/0056254 A1 * | 3/2007 | Relyea | B01D 46/0032 55/385.3 |
| 2010/0095924 A1 | 4/2010 | Harper | |
| 2015/0321134 A1 * | 11/2015 | Abell | B01D 46/0034 95/273 |
| 2015/0375602 A1 * | 12/2015 | Fields | B01D 46/10 55/385.3 |
| 2016/0067647 A1 | 3/2016 | Tate et al. | |

FOREIGN PATENT DOCUMENTS

| | | |
|---|---|---|
| DE | 202006019335 U1 | 4/2008 |
| DE | 102008060093 A1 | 6/2010 |
| DE | 102017008745 A1 | 3/2018 |
| EP | 1606128 A1 | 9/2004 |
| EP | 1837066 A2 | 9/2007 |
| EP | 2263776 A1 | 12/2010 |
| JP | H04297341 A | 10/1992 |
| JP | 2008302803 A | 12/2008 |
| KR | 20140147553 A | 12/2014 |
| KR | 20150116014 A | 10/2015 |
| WO | 2005068053 A1 | 7/2005 |
| WO | 2005094969 A1 | 10/2005 |
| WO | 2009105800 A1 | 9/2009 |
| WO | 2009155809 A1 | 12/2009 |
| WO | 2010084385 A1 | 7/2010 |
| WO | 2013023240 A1 | 2/2013 |

* cited by examiner

ENVIRONMENTAL AIR CLEANING DEVICE, ROAD VEHICLE HAVING ENVIRONMENTAL AIR CLEANING DEVICE, AND FILTER ELEMENT

CROSS-REFERENCE TO RELATED APPLICATIONS

This application is a continuation application of international application No. PCT/EP2018/051227 having an international filing date of 18 Jan. 2018 and designating the United States, the international application claiming a priority date of 18 Jan. 2017 based on prior filed German patent application No. 10 2017 000 412.9, a priority date of 22 May 2017 based on prior filed German patent application No. 10 2017 004 864.9, and a priority date of 19 Jul. 2017 based on prior filed German patent application No. 10 2017 006 794.5, the entire contents of the aforesaid international application and the aforesaid German patent applications being incorporated herein by reference.

BACKGROUND OF THE INVENTION

The invention relates to an environmental air cleaning device that is embodied in particular for separating dusts, in particular particulate matter, and/or gases. Moreover, the present invention relates to a road vehicle, in particular but not limited thereto, a passenger car or truck, in particular a light truck, that comprises an environmental air cleaning device, and to a filter element therefore.

Due to the progressing urbanization, there is the problem that, primarily in metropolitan areas, limit values for particulate matter and/or gases, such as ozone, $NO_x$, CO, in the environmental air may be exceeded by several orders of magnitudes by industrial pollution, the road traffic, and private fireplaces, primarily in adverse weather conditions (no rain, inversion, minimal wind speed, no air exchange between air layers).

One approach already documented in the prior art is to utilize the already existing vehicles (for example, approximately 44 million in Germany in the year 2014, more than 106 million in China) as mobile environmental air purifiers.

In DE 20 2006 019 335 U1, a particulate matter suction device for a vehicle is described which is arranged at the undercarriage of the vehicle and is used for filtration of the air flow that is to be introduced into the interior of the vehicle. The particulate matter suction device comprises a blower in a housing that draws in an air flow from the ambient into the housing and supplies it to a filter element. For assisting in the supply of the air mass flow into the particulate matter suction device, a projecting flow deflector is arranged at the housing.

Moreover, JP H04297341 A1 discloses a suction device which is mounted at a truck. Here, between the driver's cabin and the box body, an intake hood is provided through which the air to be purified is supplied to a purification device that is arranged along the longitudinal vehicle axis in a region below the box body. The purification device comprises a blower in order to achieve flow under as many operating conditions as possible, even when parked.

WO 2004/080740 A1 discloses a motor vehicle with an external air filter which is arranged in a region affected by the rear wheels of the vehicle, for example, in a wheel well liner or as a part of a rear mud flap. Disadvantageously, noteworthy filter surfaces for filtering a meaningful quantity of air can hardly be provided at the installation spaces described therein.

Moreover, passive flow-through systems are disclosed in WO 2005/094969 A1 (arrangement at the sidewall of a vehicle) and US 2006/0107636 A1 (arrangement on the roof).

DE 20 2005 005 673 U1 discloses a passive environmental air cleaning device that is arranged below a rear bumper face bar and whose filter element is flowed through vertically so that, at least at the inflow side, a hood must be provided which produces an unnecessary pressure loss.

WO 2009/105800 A1 discloses an environmental air cleaning device which is arranged either on the roof of a truck or in the region of the vehicle front wherein vehicle parts are positioned within the flow path downstream of the filter, respectively.

The solutions known from the prior art are disadvantageously permanently or non-detachably connected to the vehicles. However, the aforementioned weather conditions with bad air quality, in particular in regard to particle load and harmful gas load, in particular increased particulate matter load, exist mostly only for a limited period of time. It would therefore be desirable to be able to furnish a road vehicle only selectively with the environmental air cleaning device.

SUMMARY OF THE INVENTION

The invention has therefore the object to provide an environmental air cleaning device, in particular for removing particulate matter from the environmental air, which is distinguished in that it is suitable for simple installation, in particular as retrofitting solution, at an optimally flowed through installation position of a plurality of different vehicle types.

This object is solved by an environmental air cleaning device according to the invention for a road vehicle is in particular embodied for removing dusts, in particular particulate matter, and/or gases from the environmental air. It comprises at least one filter element and can be arranged in an external region of the road vehicle. The environmental air cleaning device is configured for installation by means of a roof carrier device; it comprises for this purpose a mounting device for rigidly coupling with a vehicle-side mounting device for roof loads.

This object is further solved by a road vehicle, in particular passenger car or truck, in particular light truck, in particular driven by an internal combustion engine and/or electric drive, that comprises an environmental air cleaning device that in particular is configured for removing dusts, in particular particulate matter, and/or gases from the environmental air, wherein the environmental air cleaning device comprises at least one filter element and is arranged in an external region on the roof of the road vehicle, wherein the environmental air cleaning device is an environmental air cleaning device according to the invention and is rigidly coupled by means of the mounting device with a vehicle-side mounting device for roof loads.

The object is also solved by a filter element for an environmental air cleaning device according to the invention.

The invention encompasses expressly any road vehicle types that allow for a roof installation, thus in particular also trailers that, of course, can be also be furnished with a mounting device for roof loads. The term Avehicle-side mounting device for roof loads@ is to be interpreted broadly; it encompasses in addition to classic mechanical fastening systems, for example, fastening rails and roof railing, also general car body regions in which suitable fastening elements can engage.

In a mounted state of the environmental air cleaning device on the roof of the road vehicle, a free outflow zone is present advantageously behind it. 'A free outflow zone' means that in the flow direction downstream of the filter element of the environmental air cleaning device no installations that disturb the flow may be present because the purely passive flow otherwise might no longer be ensured due to the increased pressure loss.

The coupling of the environmental air cleaning device with the road vehicle is realized in particular so as to be releasable.

A releasable fastening of the environmental air cleaning device to a vehicle-side mounting device for roof loads has several advantages. Firstly, with the vehicle-side mounting device for roof loads, a mechanically very strongly loadable element exists; moreover, mounting/demounting is possible quickly and simply and even possible for technical laypersons without problems.

Such a selective mounting/demounting of an environmental air cleaning device at a road vehicle is of particular interest when, in times of high pollutant load, bans on driving exist in affected regions for road vehicles having net emissions that are too high. In such a scenario, the end user could circumvent such a ban on driving by selectively fastening the environmental air cleaning device to his vehicle.

The term 'a filter element' is to be understood such that it can be embodied as one piece or as multiple parts and may comprise in particular a plurality of filter units, in particular filter bellows and/or filter pockets. Also, a plurality of sub filter elements can be provided which are joined to a filter element.

The present invention is also transferable to rail vehicles, such as trams, subways or commuter trains. By providing such vehicles, which are operated for public transportation, with environmental air cleaning devices, due to the generally frequent schedules as well as routes close to centers, significant air quantities can be purified. Installation spaces on the roof are also available at such rail vehicles because often air-conditioning devices and/or drive-related electrical devices are already arranged here. Due to mains operation, there is always sufficient electrical power available in order to be able to operate an active environmental air cleaning device as long as desired. Moreover, the attachment of an environmental air cleaning device due to the great mass of such rail vehicles and the generally minimal travel speeds does not cause a relevant increase of the energy consumption.

According to a further embodiment, the mounting device of the environmental air cleaning device may comprise at least a form-fit and/or friction-fit fastening element, in particular a clamping element, for example, adjustable clamping jaws or the like, and/or at least a magnetic fastening element and/or at least a suction cup. Preferably, the mounting device can comprise quick connect devices for connecting to the vehicle-side mounting device for roof loads, for example, snap connectors or latches or similar connectors.

For coupling the environmental air cleaning device according to the invention with the road vehicle, the magnetic fastening element is actively connected to a ferromagnetic car body component of the road vehicle. A magnetic attachment is advantageously possible particularly quickly; that even heavier loads can be secured reliably thereby has been demonstrated, for example, by magnetic ski carriers. Suction cups also enable a load-resistant and permanent attachment.

According to a further preferred embodiment, the filter element can comprise a folded filter element with at least one filter bellows, wherein in particular the fold height of the filter bellows amounts to at least 100 mm.

The folds of the filter bellows can extend in particular in longitudinal vehicle direction because in this way inflow into the fold pockets is optimal. The fold heights of the filter element amount advantageously to more than 200 mm; in this way, a comparatively large filter surface can be accommodated in a compact installation space. Alternatively, the filter element can be a so-called compact element. A 'compact element' is to be understood as a filter element that comprises a filter medium body which is comprised of alternatingly wound corrugated and flat layers of filter medium, wherein they are glued to each other across the surface. The flow channels which are formed by the corrugated layers are alternatingly closed off at the end faces, for example, by an adhesive plug.

Moreover, it can be provided that the filter element is a pocket filter element that comprises at least three filter pockets, preferably four or more filter pockets. Alternatively or additionally, also a V-filter element can be used that comprises at least three V-shaped filter units. Such filter element types are available on the market in the field of intake filters for gas turbines and/or HVAC systems in many size ranges.

Alternatively or additionally, the filter element can be a filter element that at least corresponds to the particle filter class M6 according to DIN EN 779.

Also, the filter element can have a variable fold height, preferably a variable fold height viewed across a vertical vehicle axis or longitudinal vehicle axis. In this way, for example, an adaptation of the outer contour of the filter element to an installation space of the environmental air cleaning device, in particular of a housing shaped beneficially in regard to flow, can be achieved.

The filter element, alternatively or additionally, may comprise a plurality of fold stabilization means which in an embodiment with folded filter bellows support the latter and are arranged at a lateral spacing of not more than 150 mm relative to each other. An embodiment of the filter element as folded filter is preferred due to the reduced pressure loss in comparison to other configurations.

Such a support of the filter bellows by fold stabilization means meets two concerns: Firstly, the filter element due to the travel speed, even in the roof region, is subjected to a high impact pressure and, secondly, the filter element is exposed to wet conditions, not only by precipitation but also due to the actions when cleaning the vehicle, for example, with a high pressure cleaner.

Surprisingly, the aforementioned problems can be elegantly solved by supporting the folds of the filter bellows by fold stabilization means at a maximum spacing of 150 mm so that the filter element survives an inflow at $V_{max}$ (in case of direct inflow), e.g. 180 km/h, preferably >200 km/h, without being damaged, as well as that it cannot be damaged by external cleaning actions by high pressure cleaners. Without effective fold stabilization means, a filter element with classic bellows configuration in case of such mechanical action is at risk of compacting of the folds, i.e., a closure of the intermediate fold spaces, which leads to a sudden loss of filter surface and thus immediately causes a corresponding rise of the flow resistance and thus a corresponding drop of volume flow.

The range of the lateral spacing of the fold stabilization means in accordance with the invention of not more than 150 mm can advantageously be limited downwardly such that the spacing preferably is greater than 15 mm, preferably greater than 30 mm, because otherwise an unfavorable ratio of filter bellows regions covered by the fold stabilization means and free flow-through regions would be present.

Advantageously, a filter element with such fold stabilization means enables that an environmental air cleaning device provided therewith can be operated optionally without separate splashing water protection (flaps, rolling shutters or the like) because the filter element itself has such a great stability that a water impact action does not lead to damage of the filter element. The environmental air cleaning device comprises therefore only a minimal complexity and can be provided surprisingly inexpensively.

Various fold stabilization means are possible that fulfill this function.

In a particular embodiment, it can be provided that the fold stabilization means each extend parallel to each other, preferably in transverse fold direction. Other angular orientations are of course also possible, for example, diagonal. It is also possible to provide two groups of fold stabilization means that each extend parallel to each other and cross each other. A parallel extension has the advantage that it can be realized without problems by continuous manufacturing processes during the filter element manufacture. An arrangement of the fold stabilization means in transverse fold direction is in particular advantageous because in this case the smallest possible support length between two neighboring folds can be realized which leads to a particularly effective fold support.

In a further also preferred embodiment, it can be provided that the fold stabilization means are present at least at a clean air side of the filter element, preferably additionally at a raw air side of the filter element. With such an arrangement at least at the clean side, it is reliably prevented that the folds will compact under the aforementioned mechanical loads. An arrangement additionally at the raw side increases the load resilience further wherein however the greater contribution to filter element stiffness is provided by the clean-side fold stabilization means.

Moreover, it can be provided that the filter medium has a bending stiffness of at least 1 $Nm^2$, preferably at least 2 $Nm^2$. This refers to an intrinsic bending stiffness of the filter medium, i.e., in an unprocessed/unfolded state. This further increases significantly the afore described load resilience.

According to yet another embodiment, the fold stabilization means can comprise at least an inner fold stabilization means that engages at least partially the intermediate fold spaces, preferably fills out the intermediate fold spaces. The inner fold stabilization means can be, for example, a continuous adhesive bead and/or an engaging stabilization comb. A Acontinuous adhesive bead@ is to be understood in the present case as an adhesive bead which, already prior to folding, is applied onto the flat filter medium and thus extends completely from the fold base to the fold tip after folding, i.e., is indeed continuous. As an alternative or in addition thereto, at least one outer fold stabilization means can be provided that is connected at least with respective neighboring fold tips. The outer fold stabilization means can comprises at least one adhesive bead connected at least with the fold tips, at least one thread connected at least with the fold tips and/or at least one stabilization band or rib and/or at least one support grid. The outer fold stabilization means can moreover be connected by material fusion with the fold tips which contributes to an optimal force introduction from the fold tips into the outer fold stabilization means. Such a material-fused connection, for example, can be provided by welding the outer fold stabilization means to the filter bellows, in particular the fold tips, in particular by hot plate welding. In contrast to the inner fold stabilization means, the adhesive bead of the outer fold stabilization means is not a continuous adhesive bead but one that is connected surficially with the fold tips.

The adhesive beads of the inner and/or outer fold stabilization means can have a width in a range of 0.5 mm to 12 mm, preferably 1 mm to 8 mm. In a particular embodiment, the folds of the filter bellows are Ablocked@ so that the fold spacing corresponds to approximately twice the width of the continuous adhesive beads (as inner fold stabilization means). A hot melt is conceivable as material for the adhesive beads, for example.

Alternatively or additionally, the filter medium of the filter element of the environmental air cleaning device may comprise one or several embossment lines that preferably extend in transverse fold direction. By means of such embossment lines, the stiffness of the folds of the filter bellows is additionally increased by an increase of the geometrical moment of inertia, which additionally contributes to preventing a collapse/compacting of the folds under the action of pressure.

Moreover, it can be provided that the filter element of the environmental air cleaning device comprises a collapse pressure strength of at least 15 mbar, preferably at least 25 mbar.

According to a further embodiment, it is possible that the environmental air cleaning device comprises at least one receiving housing in which the at least one filter element is received that comprises at least one inlet opening and one outlet opening and is connectable by means of the mounting device to the vehicle-side mounting device for roof loads of the road vehicle. In the intended travel direction, the inlet opening(s) can be provided at the receiving housing at the front and/or laterally, at the top or bottom. In case of a lateral arrangement at an upper, lower or lateral wall, an arrangement of the inlet opening(s) at the forward region of these walls, viewed in the travel direction, is preferred in order to be able to guide the flow with minimal constructive expenditure inside the environmental air cleaning device. Moreover, it is possible and expedient that the environmental air cleaning device comprises at least two filter elements which, in transverse vehicle direction or vertical vehicle direction, are arranged adjacent to each other, in particular at a predetermined spacing between them. Of course, more than two filter elements can also be used; this can be particularly expedient when the at least one filter element is assembled of several filter units or sub filter elements.

The receiving housing can comprise a titanium dioxide-containing coating at its exterior side for photo-catalytic oxidation of $NO_2$ to $NO_3$.

Between the filter elements, a spacing can be provided also which, for example, may serve for passing through cables, hydraulic lines and the like. Moreover, it can be expedient to employ two separate filter elements because one large filter element that extends across a significant portion of the vehicle width is difficult to produce and moreover has a great weight, which makes the exchange more difficult. In an embodiment with two or more separate filter elements, it can moreover be provided that each filter element comprises its own housing.

According to yet another embodiment, the environmental air cleaning device can comprise at least one flow deflector that is preferably provided at a forward outer lateral edge, extending in vertical vehicle direction, of the environmental air cleaning device. Moreover, the flow deflector can be provided at a forward, lower and/or upper edge extending in transverse vehicle direction of the environmental air cleaning device. In this way, the filter element can be designed to be comparatively small and the impact pressure upstream of the filter element can be increased so that a flow is possible even at minimal travel speeds. In a preferred embodiment, such flow deflectors are arranged at the leading lateral edges (vertical) of the environmental air cleaning device as well as at the lower transverse edge (horizontal).

The flow deflector can be a flow deflector plate that is preferably positioned tilted at an angle relative to the vertical vehicle direction, longitudinal axis or transverse axis. The flow deflector plate can be embodied, for example, as a flow guide plate or shaped rubber part, rubber profile and/or rubber lip. The invention is however not limited to the aforementioned materials; for example, the flow deflector can comprises in particular also other synthetic materials. Optionally, also a switching function of the flow deflector can be provided whereby this may be an adjustable flow guide plate that can be adjusted between various positions in order to influence the air flow guiding action. The flow guide plate is adjustable between an inoperative position and an operative position wherein, in the operative position, the air flow is guided to the filter element in the particulate matter suction device. In the inoperative position, however, the air supply to the filter element can at least be reduced.

Preferably, the at least one flow deflector can be designed such that in driving operation the local air pressure in the inlet region of the environmental air cleaning device is increased and/or is lowered in the outlet region. In this way, the separation performance per travel distance can be improved.

According to an advantageous further embodiment, it can be provided that the environmental air cleaning device comprises at least one pre- or coarse separator which is arranged upstream of the at least one filter element in flow direction, in particular a separator grid, separator net, a baffle plate and/or a preseparator nonwoven.

Moreover, it can be also provided, for example, that the pre- or coarse separator, in particular the separator grid, is connected with the at least one flow deflector. The pre- or coarse separator, in particular the separator grid, is provided to prevent that foreign matter, which might damage the filter element due to its kinetic energy, can pass into the environmental air cleaning device. The separator grid can be designed for this purpose as a coarse mesh and can have a mesh size of 1 mm to 4 mm so that only a negligible small additional pressure loss is generated by it. Such grids are available extremely inexpensively, for example, as aluminum expanded metal.

A preseparator nonwoven can be arranged in particular at the raw side on the filter element, for example, glued thereto, or can be present at a predefined spacing to the filter element, wherein an arrangement directly on the filter element has the advantage that the preseparator nonwoven can be exchanged together with the filter element during service. Advantageously, the preseparator nonwoven has in addition water-separating and draining properties and is therefore capable of additionally protecting the filter element.

According to an advantageous further embodiment, it can be provided that the environmental air cleaning device comprises, upstream of the at least one filter element in flow direction, a water separator for separating rain water and/or splashing water. The water separator can preferably comprise a lamellar separator and/or a hydrophobic, in particular hydrophobically impregnated, separator layer and/or in particular closable flaps or lamellas. The water separator can in particular be switched on or positioned in the flow path as a function of a rain sensor signal and/or windshield wiper signal. In case of closable flaps or lamellas, they can be adjusted depending on a rain sensor signal or windshield wiper signal. The water separator can in particular be arranged upstream or downstream of the pre- or coarse separator. A windshield wiper signal, when coupling the environmental air cleaning device with the road vehicle, can be extracted without problems from a data bus of the vehicle and describes an operating parameter of the windshield wiper (e.g., on/off, wiper speed).

According to an advantageous further embodiment, it can be provided that at the environmental air cleaning device a mounting opening for the filter element is provided which is in particular arranged laterally, vertically or at the rear in intended travel direction. In this context, it is preferred that the environmental air cleaning device comprises holding means for the at least one filter element which prevent by form fit a movement of the filter element in travel direction in order to prevent a release of the filter element in case of braking and rear-ending situations. The holding means are preferably configured such that the opening cross section within the holding means is smaller than the cross section of the filter element transverse to the travel direction.

According to a further advantageous embodiment, it can be provided that the environmental air cleaning device comprises a drawer mechanism and/or releasable locking connections for mounting the filter element in the environmental air cleaning device. In this way, an easily serviceable environmental air cleaning device can be provided.

According to a further embodiment, it is proposed to embody the filter element with an inflow surface of at least 100 mm×250 mm, preferably at least 150 mm×500 mm. Alternatively or in addition, it can be provided that the volume of the at least one filter element amounts to at least 6.5 l, preferably at least 15 l. The net filter surface of the at least one filter element should be at least 3 $m^2$, preferably at least 7 $m^2$, most preferred at least 15 $m^2$. In case of use of a partially or fully synthetic filter medium instead of a cellulose-based one, smaller filter surfaces may also be sufficient.

The filter medium can be a single-layer or multi-layer filter medium that has at least a particle filter layer, in particular a cellulose layer and/or a synthetic fiber layer, in particular a synthetic fiber nonwoven, and/or at least a gas filtration layer, in particular with an active carbon bulk material as active material. The gas filtration layer can be provided with corresponding active materials which enable an adsorption/absorption of various health-hazardous gases from the environmental air, for example, ozone, sulfur dioxide, nitrogen oxides, and carbon monoxide. For this purpose, different active materials can also be used. The active carbon can also be impregnated in order to improve the separation of certain gases, for example, by use of copper or copper compounds in order to increase the absorption of $NO_x$. By use of such an active carbon bulk material, the absorption performance of the employed filter element(s) can be adjusted such that the environmental air cleaning device absorbs approximately as much $NO_x$ as is emitted by the road vehicle to which it is mounted. Preferably, catalytic active carbon can be used that, for example, is useable for conversion of nitrogen oxide to less harmful substances, for example, nitrogen and carbon dioxide.

A height of the at least one filter element can be in a range of, for example, between 100 mm and 600 mm, preferably between 150 mm and 500 mm. The parameters that have the greatest effect on the separation performance of the environmental air cleaning device in the mounting situation according to the invention are the height of the filter element and the flow resistance of the filter element which is determined significantly by the filter concept but not by the inflow speed. Therefore, a certain minimum height must be observed in order to achieve a satisfactory separation performance.

The environmental air cleaning device should exhibit a pressure loss for an inflow with air at standard conditions with 1.5 m/s of at most 200 Pa, preferably at 2.5 m/s of at most 250 Pa.

In one configuration, the environmental air cleaning device comprises at least one air conveying device for assisting the flow, in particular for a controlled assistance of the flow, for example but not limited to, when a vehicle is parked or at low travel speeds, in particular depending on the travel speed. The air conveying device comprises in particular an electrical connecting element that is connectable to the power supply of a road vehicle. The power supply of the road vehicle can be, for example, a vehicle electrical system that by means of hardwiring or an external electrical socket is useable for connecting the air conveying device of the environmental air cleaning device.

Alternatively or additionally, the power supply of the air conveying device can also be a photovoltaic power source which can be arranged on the environmental air cleaning device and/or a wind turbine that can be driven by the oncoming wind when driving.

The air conveying device can be an axial fan or an axial blower. The air conveying device can comprise in particular an electrical drive. In this context, by means of the vehicle electrical system, a sufficiently large electrical power for driving the at least one air conveying device can be tapped; for example, the air conveying device can comprise an electrical power of 120 W. Axial blowers or axial fans are preferably used as a result of their advantageously minimal installation dimensions viewed in axial direction; the invention is however not limited to this; radially or diagonally operating fluid flow engines are also encompassed by it. The invention encompasses expressly passive flow environmental air cleaning devices as well as active flow environmental air cleaning devices with at least one air conveying device. The air conveying device is preferably operated by suction in relation to the filter element.

The environmental air cleaning device according to the invention functions in one embodiment according to the principle of passive flow by means of the impact pressure which is generated by the travel speed. Since the problem of excessive air pollution primarily exists in metropolitan areas in which the travel speed is usually below 40 km/h, the pressure loss of the environmental air cleaning device should be as minimal as possible so that the latter can still be passively flowed through at the impact pressures usually occurring at inner-city speeds. For example, the impact pressure at a travel speed of 30 km/h is approximately 40 Pa and at 40 km/h approximately 75 Pa.

A further aspect of the invention concerns a road vehicle, in particular a passenger car, or a truck, in particular a light truck. The road vehicle comprises an environmental air cleaning device according to the invention which is embodied for removing dusts, in particular particulate matter, and/or gases from the environmental air and is arranged in an external region of the road vehicle. The environmental air cleaning device comprises at least one filter element and is rigidly coupled by means of the mounting device with a vehicle-side mounting device for roof loads.

The advantages of such an arrangement have already been described in connection with the environmental air cleaning device; they can be applied without limitation to the road vehicle according to the invention. The features which have been disclosed in connection with the environmental air cleaning device according to the invention can be combined in any combination also with the road vehicle according to the invention, and vice versa.

The arrangement of the environmental air cleaning device external to the car body of the vehicle is advantageous because the shape of a vehicle is usually designed such that the flow is guided about the vehicle in the best possible way. An arrangement of the environmental air cleaning device external to the car body can therefore contribute to optimizing the air quantity which can be passed through the environmental air cleaning device, in particular when the environmental air cleaning device or flow deflecting means are designed, as preferred, so that a portion of the air which is flowing about the vehicle can be deflected in a targeted fashion to the environmental air cleaning device; this is possible especially well in case of the arrangement on the roof.

The environmental air cleaning device can be flowed through in particular in the longitudinal vehicle direction. Preferably, a free outflow zone is provided in travel direction downstream of the environmental air cleaning device. As an alternative to the flow direction in longitudinal vehicle direction, the flow can also be referred to as Ahorizontal@ when the vehicle is standing on a horizontal support. In a beneficial arrangement of inlet and outlet openings for the air to be purified and a corresponding conduit of the air to be purified within the environmental air cleaning device, a flow control within the environmental air cleaning device at least partially perpendicular to the travel direction is also possible, of course.

In a particularly preferred embodiment, the at least one filter element of the environmental air cleaning device can be flowed through in longitudinal vehicle direction or Ahorizontally@, i.e., it is installed in relation to the environmental air cleaning device such that no flow deflections are required which generate a disadvantageous pressure loss.

Moreover, the environmental air cleaning device can extend advantageously across a significant portion of a vehicle width. Preferably, the environmental air cleaning device extends across at least 30% of the vehicle width, more preferred across at least 40%.

In order to provide an impression of the excellent efficiency of such a vehicle according to the invention with environmental air cleaning device, flow simulations based on the following parameters were performed:

particle concentration in the test air with 25 Φg/m; PM2.5, 50 Φg/m; PM10, height of the filter element 300 mm, width of the filter element 600 mm, degree of separation for PM2.5 and PM10 80%, cellulose-based filter medium, thickness of the filter medium 0.7 mm, air permeability 700 l/m$^2$ s with 9 m$^2$ effective filter surface.

Based on these assumptions, the result is that such a filter element already for passive flow separates more PM10 particles than generated by the diesel engine. In this context, a PM10 emission of 6 mg/km was assumed. Therefore, the emissions can be reduced to the value of an electric vehicle.

By installation of active components, for example, fans, the separation performance at low speeds can be significantly improved again.

Finally, a filter element for the environmental air cleaning device according to the invention is claimed. The features and advantages which have been mentioned in relation to the road vehicle according to the invention and to the environmental air cleaning device according to the invention are transferable thereon in any combination.

Furthermore, a method for reducing the total emission of a road vehicle with at least one predetermined emission component is disclosed. The method provides that in particular an environmental air cleaning device according to the invention is mounted in a predetermined mounting position at a road vehicle, wherein the environmental air cleaning device is configured for mounting in the mounting position such that in driving operation through the environmental air, in which predefined limit values are reached or surpassed and which is supplied in the region of the mounting position to the environmental air cleaning device, at least the quantity of the average emission of the at least one emission component is separated by means of the environmental air cleaning device. A vehicle which is obtainable by this method is also part of the present invention.

For example, in this context a determination of the average emission of the road vehicle of at least one emission component is first performed, in particular of particles and/or nitrogen oxides, in particular per kilometer, in particular in city driving. For this purpose, either measurements while driving or average values can be utilized, for example, manufacturer specifications.

In particular subsequently, a mounting position of the environmental air cleaning device at the vehicle can be preferably determined. More preferred, based on the concentrations of emission components such as particulate matter that depend partially on the spacing from the road surface, the air contamination, i.e., the concentration of the at least one emission component in the mounting position, in particular at its spacing from the road surface, can be determined, for example, by absolute measurement or by a comparative measurement with measurements at standard measuring height at which official measurements are performed. As mounting positions, the following are in particular conceivable: in a rear region in the region of a rear bumper face bar or integrated into a rear bumper face bar, in a front region in the region of a front bumper face bar, on the roof, at or on a trailer or in an underfloor region, in particular at a vehicle rear behind a rear axle of the road vehicle, viewed in the travel direction.

The described method can be described, ordered according to steps, as follows:
a. determining the average emission of the road vehicle of at least one emission component, in particular of particles and/or nitrogen oxides, in particular per kilometer, in particular in city driving;
b. determining a mounting position of an environmental air cleaning device at the vehicle;
c. optionally detecting the air contamination in the mounting position of the environmental air cleaning device upon reaching or surpassing predefined limit values;
d. mounting an environmental air cleaning device in the mounting position, wherein the environmental air cleaning device for mounting in the mounting position is configured such that in driving operation through environmental air, in which predefined limit values are reached or surpassed, at least the quantity of the average emission of the at least one emission component of the road vehicle is separated by means of the environmental air cleaning device.

Moreover, the mounting position can be selected such that, in particular assisted by flow guiding means, at least a portion of the emissions of the road vehicle are supplied to the environmental air cleaning device, for example, the dust emissions of brake discs and/or tires or the exhaust emissions from the exhaust gas manifold of an internal combustion engine of the road vehicle. In this way, the separation performance is improved by selecting a mounting position with locally increased concentration of emission components. In this context, the spacing between the outlet of the exhaust system and the environmental air cleaning device amounts preferably to 5 cm to 50 cm, particularly preferred 5 cm to 30 cm.

Preferably, the mounting position is selected such that the environmental air cleaning device is arranged at a height of smaller than 2 m, preferably smaller than 1.5 m, particularly preferred smaller than 1 m, measured from the road surface. Preferably, the mounting position is moreover selected at a location where a concentration increase of dust, located in the region of the road surface, is present as a result of turbulence caused by the vehicle according to the invention. This applies in particular to the positions in the rear region in the region of a rear bumper face bar or integrated in a rear bumper face bar, on the roof, on a trailer or in an underfloor region at a vehicle rear behind the rear axle of the road vehicle, viewed in the travel direction.

BRIEF DESCRIPTION OF THE DRAWINGS

Further advantages and expedient embodiments can be taken from the additional claims, the figure description, and the drawings.

DESCRIPTION OF PREFERRED EMBODIMENTS

Figure 1:
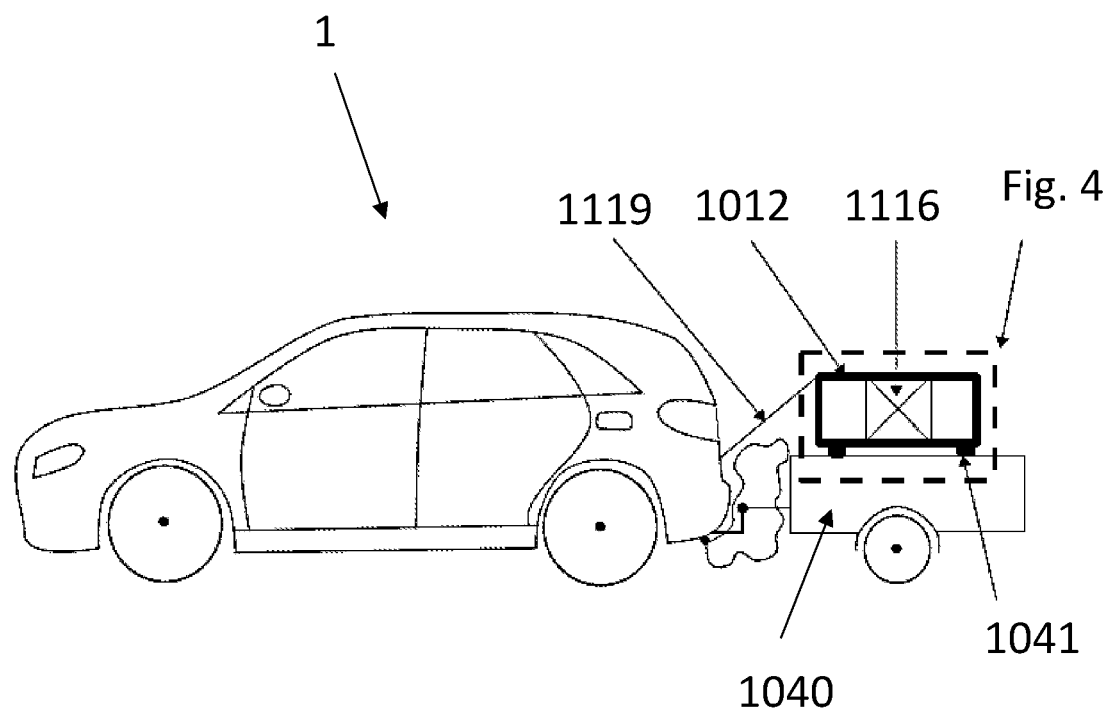
FIG. 1 shows in schematic illustration a road vehicle according to the invention in a side view.

FIG. 1 shows in schematic illustration a road vehicle 1 according to the invention in a side view in which the environmental air cleaning device 1012 is arranged in the rear region of the road vehicle 1 on a trailed trailer 1040 and attached by means of fastening means 1041.

Figure 2:
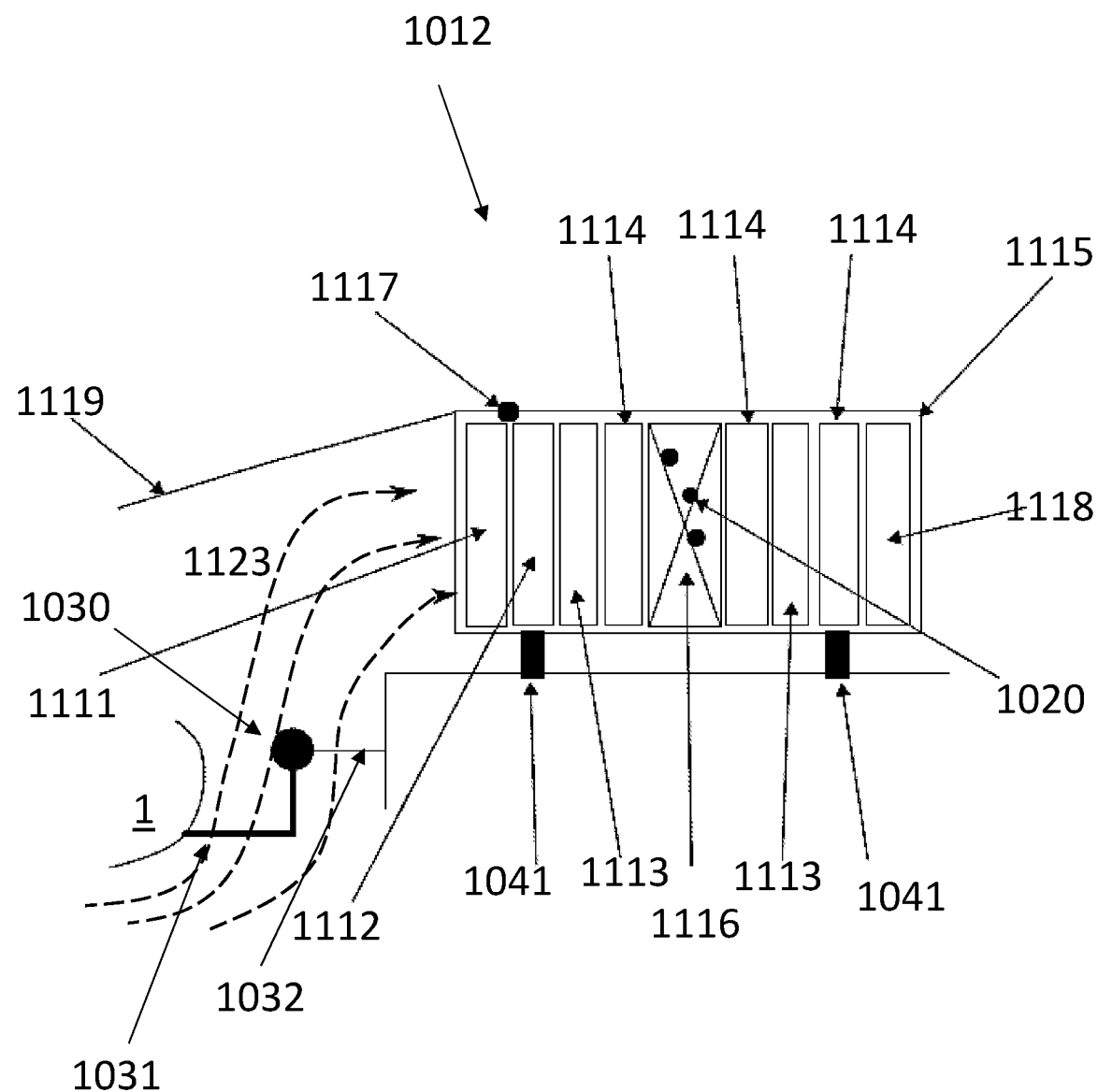
FIG. 2 shows in schematic illustration a first embodiment of an environmental air cleaning device preferably for the road vehicle in FIG. 1.

FIG. 2 shows in detail view a detail of FIG. 1 with a schematic illustration of an embodiment of an environmental air cleaning device 1012. The environmental air cleaning device 1012 is arranged on a trailer 1040 and attached by means of fastening means 1041, for example, by means of a transverse carrier attachment arrangement as it is used also for roof loads of road vehicles. The embodiment of FIG. 2 is horizontally flowed through. For enhancing the inflow, at the end face of the environmental air cleaning device 1014 which is facing the vehicle and which forms or comprises the inlet 1111, in particular at its upper edge, an inflow-side flow deflector in the form of a guide vane 1119 is arranged in order to supply the air to the inlet 1111.

Figure 3:
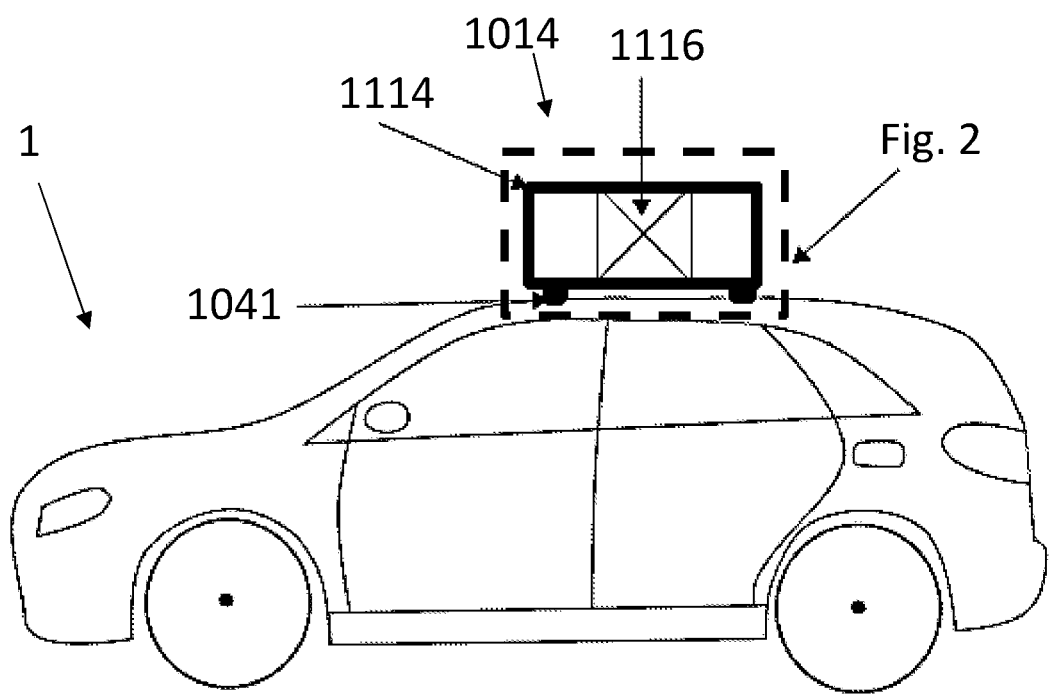
FIG. 3 shows in schematic illustration a road vehicle according to the invention in a further embodiment in a side view.

FIG. 3 shows in schematic illustration a road vehicle 1 according to the invention in a side view in which the environmental air cleaning device 1014 is arranged on or above the roof of the road vehicle 1 and attached by means of fastening means 1041. The fastening means can be in particular form-fit and/or friction-fit fastening elements, in particular clamping elements, for example, with adjustable clamping jaws or the like. Moreover, magnetic fastening elements and/or suction cups can be employed.

Figure 4:
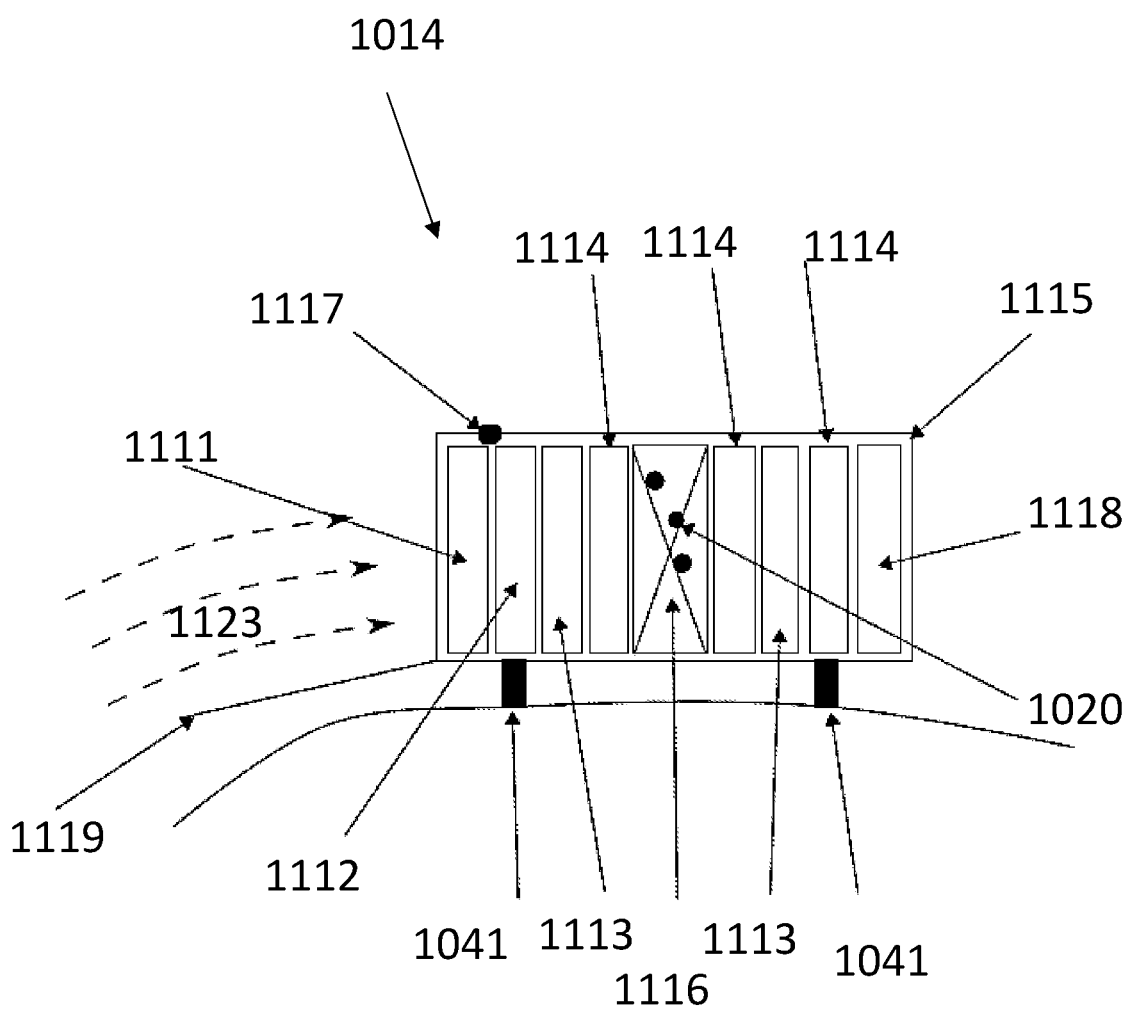
FIG. 4 shows in schematic illustration a first embodiment of an environmental cleaning device preferably for the road vehicle in FIG. 3.

FIG. 4 shows in detail view a detail of FIG. 3. It can be seen that the embodiment of the environmental air cleaning device 1014 corresponds substantially to that of FIG. 3 wherein a deviation resides in that at the end face of the environmental cleaning device 1014 which is arranged in the travel direction at the front and which forms or comprises the inlet 1111, in particular at its lower edge, an inflow-side flow deflector or a guide vane 1119 is arranged in order to supply the air to the inlet 1111.

Figure 5:
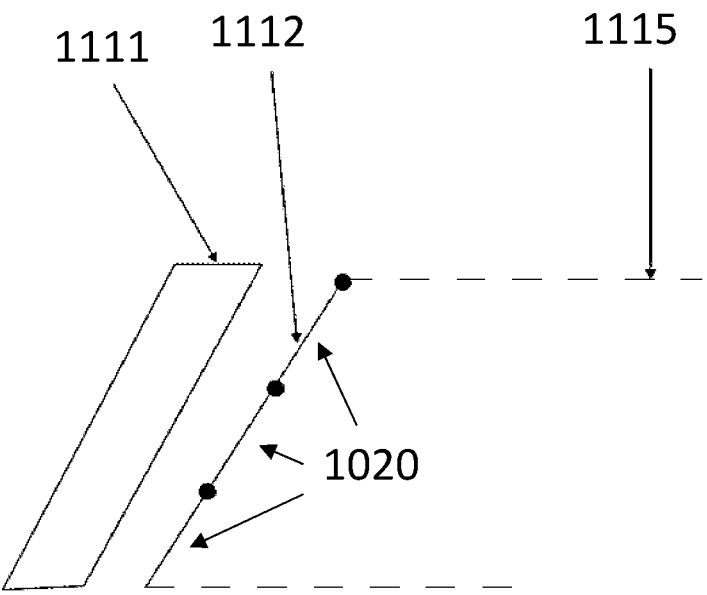
FIGS. 5 and 6 show a schematic illustration of an inflow-side region of an environmental air cleaning device, respectively.
Figure 6:
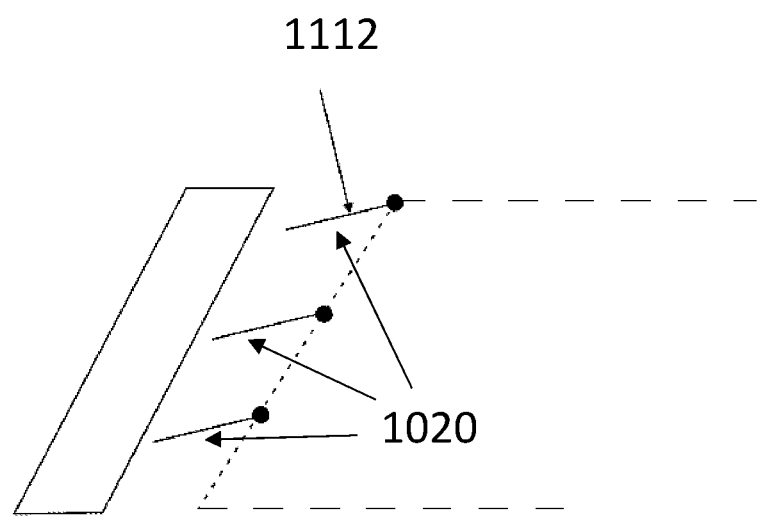

FIGS. 5 and 6 show a schematic illustration of a possible configuration of an inflow-side region of an environmental air cleaning device according to the invention. As a protective stage 1112, here preferably one or several motor-actuated means, for example, a grid, for preventing entry of animals such as rodents, birds or the like is encompassed.

Figure 7:
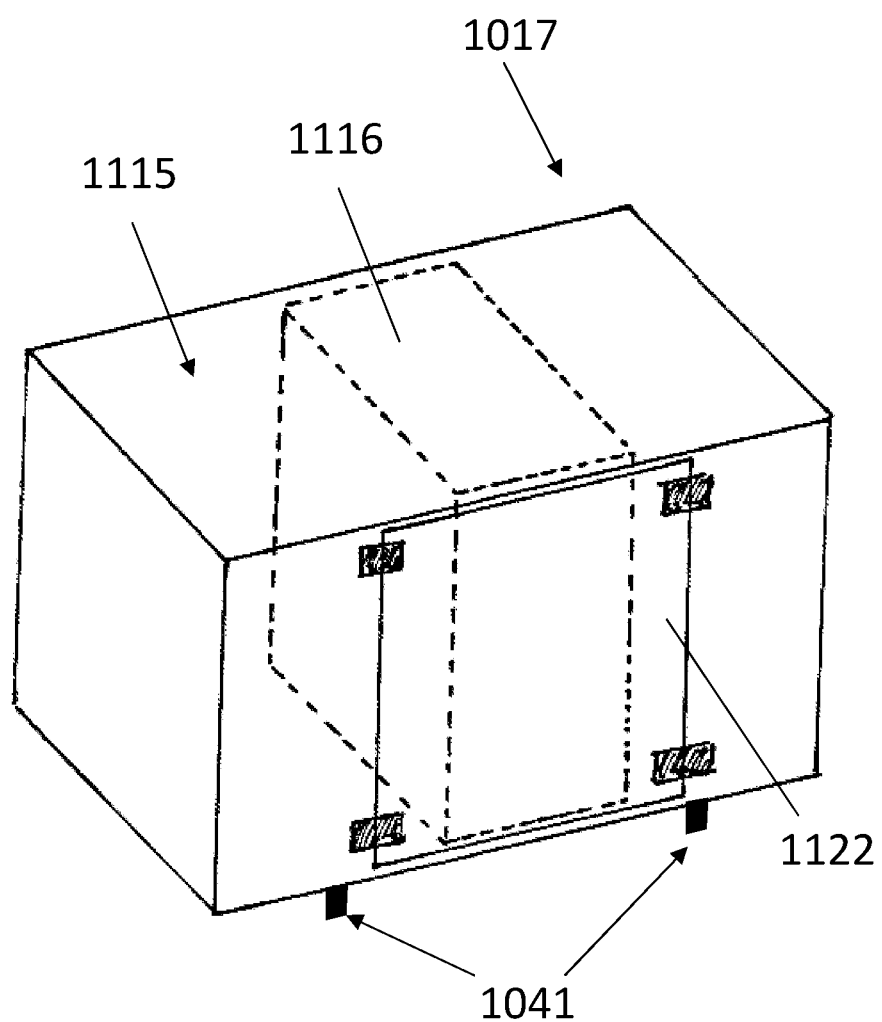
FIG. 7 shows an isometric illustration of a modification for an environmental air cleaning device according to the invention.

FIG. 7 shows an isometric illustration of a modification 1017 for an environmental air cleaning device 1012, 1014, 1017, 1018 according to the invention. According to this modification, the housing 1115 comprises a servicing opening with a closable servicing flap 1122 that permits an exchange of the filter element 1116. In environmental air cleaning devices 1012, 1014, 1017, 1018 which are configured for inflow at the front, at the bottom or at the top, for example, those illustrated in FIG. 1 to FIG. 4, an arrangement of the servicing flap 1122 at a lateral wall of the housing 1115 in travel direction or at an upper wall of the housing 1115 facing away from the road surface is possible and advantageous for servicing.

Figure 8:
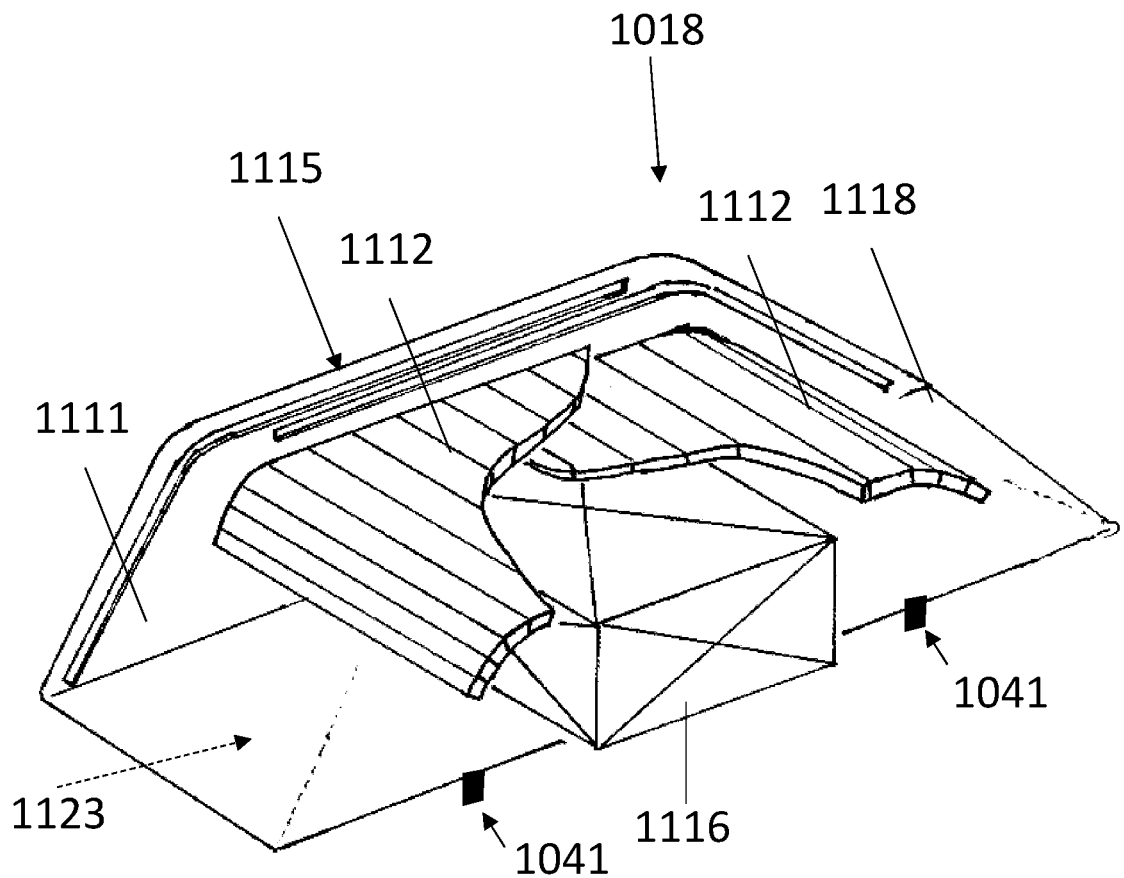
FIG. 8 shows an isometric illustration of a further modification for an environmental air cleaning device according to the invention.

FIG. 8 shows an isometric illustration of a further modification 1018 for an environmental air cleaning device 1012, 1014, 1017, 1018 in accordance with the invention. Here, as a protective stage 1112, an inflow-side first motor-driven rolling shutter 1124 and/or a second motor-driven rolling shutter 1125 is arranged in the housing 1115 which can close off inlet 1111 or outlet 1118. As in case of the aforementioned flaps, the control of these rolling shutters or flaps is preferably designed such that the rolling shutters or flaps are closed or will be closed when the vehicle is parked and/or beginning at a predetermined flow speed (travel speed), for example, 100 km/h, and/or in case of rain, snow or other temporary water introduction (as in a car wash, when actuating the windshield wiper device or the like). A functional connection with the modification illustrated in FIG. 7 is conceivable in such a way that the servicing flap 1122 can be opened only when the flaps or rolling shutters are open wherein the flaps or rolling shutters (i.e., more generally: the inlet 1111 and the outlet 1118) are respectively closed when the vehicle is not in operation and are open when the vehicle is in operation. Of course, the aforementioned functions are also controllable independent from each other, depending on the operating state of the vehicle.

Figure 9:
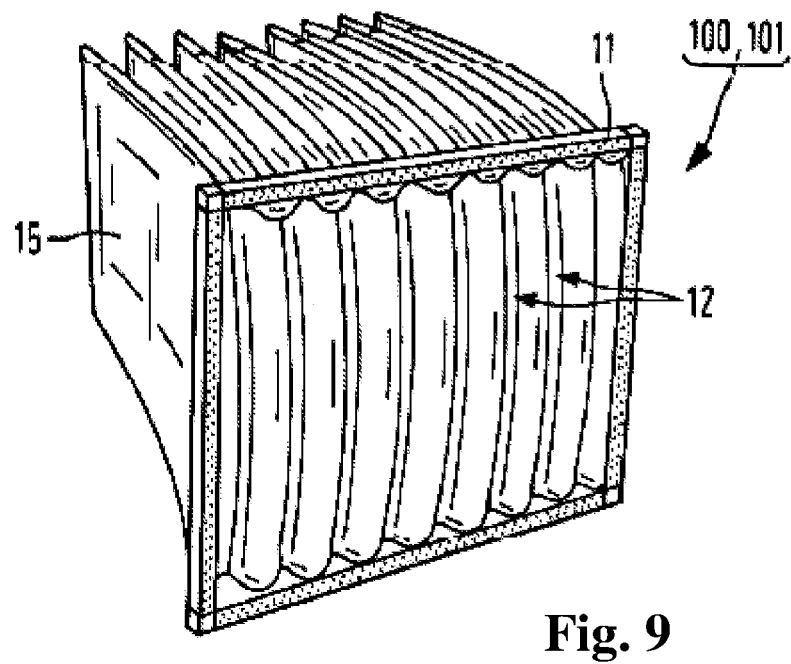
FIG. 9 shows an isometric illustration of a pocket filter as it can be used in the environmental air cleaning device according to the invention.

In FIG. 9, schematically a pocket filter element 100, 101 is illustrated as it can be used in the environmental air cleaning device 10 of the road vehicle 1 according to the invention. The pocket filter element 100, 101 has a circumferentially extending rectangular frame 11 to which a plurality of, here eight, filter pockets 15 are attached. The filter pockets 15 are comprised of a suitable filter medium and are formed by sewing from the filter medium. Suitably, the pocket filter element is to be arranged such in the environmental air cleaning device 10 that the filter pockets 15 with their hollow spaces 12, which form the respective inflow sides, are facing forwardly in travel direction. In order to prevent that the filter pockets 15 blow open too strongly by the inflow, oppositely positioned flat filter medium sections can be sown together by means of a suitable thread length. In other respects, the configuration of such filter elements is known to a person of skill in the art. Pocket filter elements are available on the market in a plurality of dimensions, for example, in the field of intake filters for gas turbines or the HVAC field. The illustrated pocket filter element 100, 101 has the dimensions 287 mm×592 mm×365 mm.

Figure 10:
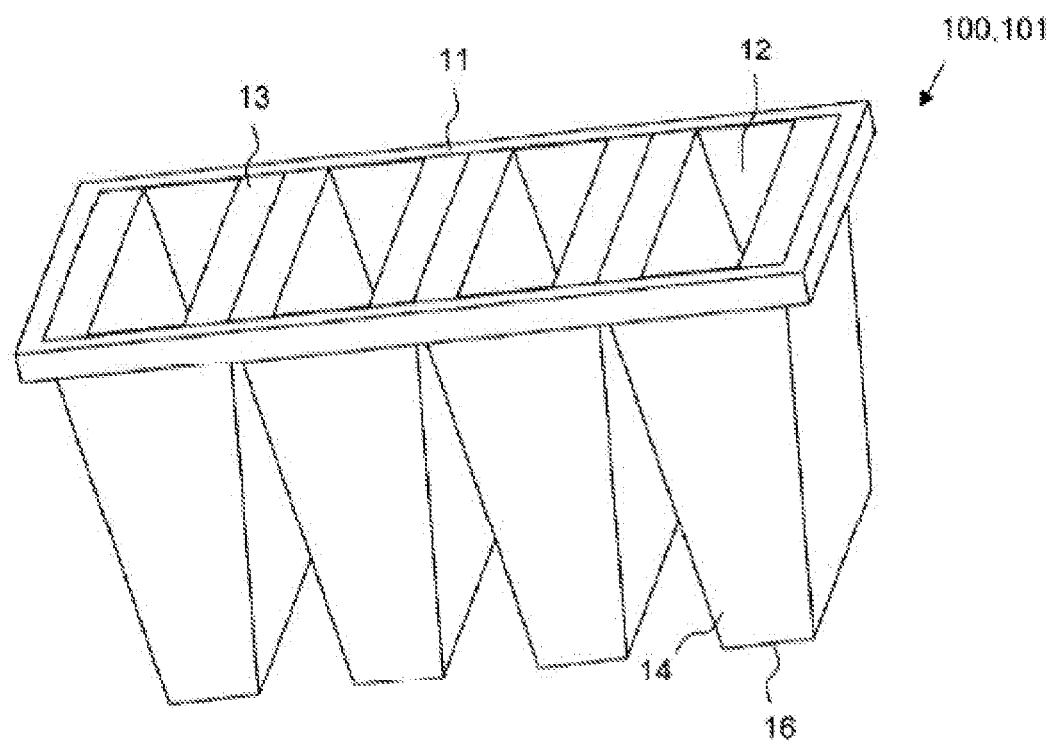
FIG. 10 shows an isometric illustration of a V-filter as it can be used in the environmental air cleaning device according to the invention.

Moreover, in FIG. 10 a V-filter element 100, 101 is illustrated that comprises four filter units, arranged in a V-shape relative to each, which are formed by two flat filter elements 13, respectively, wherein the flat filter elements 13, for example, comprise a folded filter bellows. The illustrated V-filter element 100, 101 comprises therefore eight flat filter elements 13. The V-filter element 100, 101 comprises a frame 11 to which the V-shaped filter units are attached. At the bottom side which is facing away from the frame 11, two flat filter elements each that form a V-shaped filter unit are fluid-tightly connected to each other, respectively. The lateral surfaces which delimit the $\Lambda V @$ are each fluid-tightly closed off by a flat cover 14. For installation, the remarks in relation to FIG. 9 apply: The V-filter element 100, 101 is suitably inserted into the environmental air cleaning device 1012, 1014, 1017, 1018 such that the hollow spaces 12 face the inflow side, i.e., in the travel direction upon installation in the road vehicle 1 according to the invention. The dimensions of the V-filter element amount to 287 mm×592 mm×300 mm. The fold heights of the respective flat filter elements 13 amount to 25 mm in the illustrated embodiment.

For the pocket filter element illustrated in FIG. 9 as well as for the V-filter element illustrated in FIG. 10, it holds true that a suitable number thereof can be arranged adjacent to each other in order to provide an environmental air cleaning device 1012, 1014, 1017, 1018 with a sufficient width. Both variants can be used in the embodiments of road vehicles or environmental air filter devices described above and in the following.

As filter materials, fully synthetic nonwovens, glass fiber or cellulose media as well as combinations thereof can be used which in addition may comprise an electret action or can be accordingly furnished in order to achieve a good ratio of pressure loss and separation performance. Preferably, these media have hydrophobic properties and are distinguished by a good water stability. Also, a filter medium can be used that completely consists of cellulose. The preferred bursting pressure of the filter elements should be in particular above 500 Pa, preferably above 1,000 Pa. The preferred dust capacity of the filter elements amounts to preferably at least 300 g, preferably more than 700 g.

Figure 11:
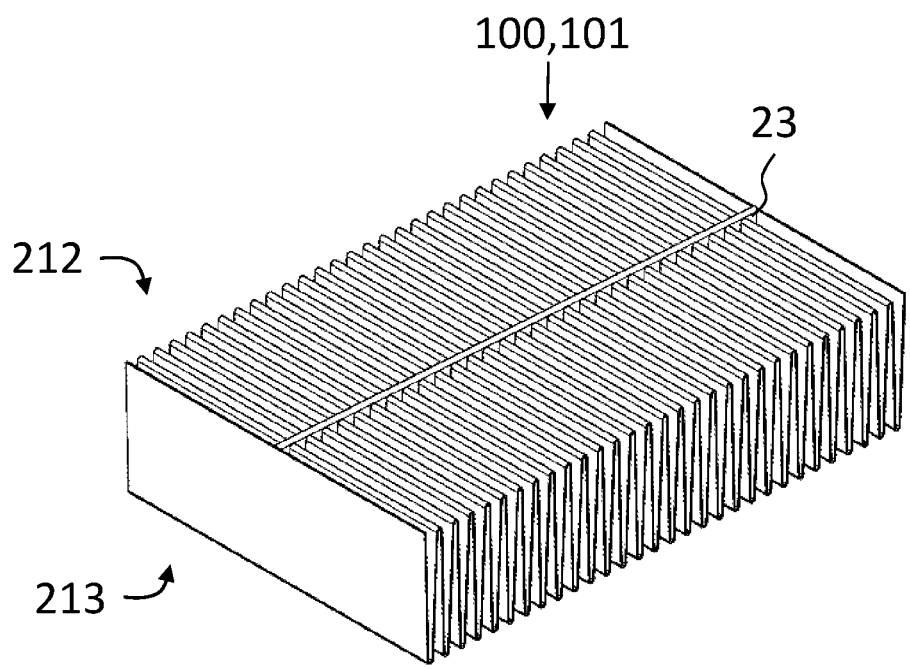
FIG. 11 shows an isometric illustration of a flat filter element with fold stabilization means as it can be used in the environmental air cleaning device according to the invention.

In FIG. 11, finally a detail of a filter element 100, 101 is illustrated that comprises a plurality of fold stabilization means 23 which support the filter bellows and are present at a lateral spacing of not more than 150 mm relative to each other. The illustration of the filter element 100, 101 is a greatly simplified illustration based on which however the concept of the fold support by the fold stabilization means 23 can be explained.

The filter element 100, 101 comprises at its clean side 212 a so-called continuous adhesive bead 23 which represents an Ainner fold stabilization means@ in the meaning of the invention. A continuous adhesive bead is understood presently as an adhesive bead 23 which already prior to folding is applied onto the flat filter medium and thus after folding extends completely from the fold base to the fold tip, i.e., is indeed continuously embodied.

What is claimed is:

1. An environmental air cleaning device for a road vehicle,
    wherein the environmental air cleaning device is configured to remove dust, particulate matter, and/or gases from environmental air,
    wherein the environmental air cleaning device comprises:
        one or more folded filter elements having at least one filter bellows of a single-layer or multi-layer filter medium for removing particles, the filter medium folded into a plurality of folds, the filter medium comprising cellulose or a synthetic fiber nonwoven;
        a receiving housing having:
            an inlet opening for receiving environmental air to be cleaned into an interior of the receiving housing, the inlet opening arranged at a first axial end of the receiving housing,
            an outlet opening for discharging cleaned air into the environment, arranged on an opposing second axial end of the receiving housing;
            a longitudinal axis extending through the receiving housing from the inlet opening to the outlet opening;
            a filter element receiving space arranged within the interior of the receiving housing between the inlet opening and the outlet opening;
            wherein the one or more folded filter elements are installed inside the receiving housing in the filter element receiving space;
            a filter element receiving opening arranged in a wall of the receiving housing, the filter element receiving opening sized to receive the one or more folded filter elements into the filter element receiving space of the receiving housing; and
            an openable flap, removable cover or door arranged on and closing the filter element receiving opening of the receiving housing;
        the receiving housing further having an inlet side component selected from the set consisting of:
            a flow deflector guide vane arranged proximate to the inlet opening and projecting outwardly at a tilt angle>0 degrees relative to the longitudinal axis of the receiving housing, the flow deflector guide vane deflecting environmental air either into the inlet opening or deflecting air to bypass the inlet opening;
            a motor driven protective stage arranged at the inlet opening, and movable from a closed position to an open position, the motor driven protective stage arranged between the inlet opening and the one or more folded filter elements; and
            a motor driven rolling shutter arranged between the inlet opening and the one or more folded filter elements, the motor driven rolling shutter movable from a closed position in which the inlet opening is closed off, to an open position in which the inlet opening is open to deliver environment air to the one or more folded filter elements,
            or combinations thereof;
    wherein the environmental air cleaning device includes a mounting device configured to releasably and rigidly couple the receiving housing onto an exterior of the road vehicle.

2. The environmental air cleaning device according to claim 1, wherein
    the mounting device of the environmental air cleaning device comprises at least one fastening element,
    wherein the at least one fastening element is a form-fit fastening element; a friction-fit fastening element; or a form-fit and friction-fit fastening element.

3. The environmental air cleaning device according to claim 2, wherein
    the at least one fastening element is selected from the group consisting of a clamping element, a magnetic fastening element, and a suction cup.

4. The environmental air cleaning device according to claim 1, wherein
    the one or more folded filter elements have at least one folded filter bellows having folds of a fold height of at least 100 mm.

5. The environmental air cleaning device according to claim 4, wherein
    the one or more filter elements comprise
        a plurality of fold stabilization means supporting the at least one filter bellows and positioned at a lateral spacing of not more than 150 mm relative to each other.

6. The environmental air cleaning device according to claim 5, wherein
    the plurality of fold stabilization means extend parallel to each other in a transverse fold direction of the folds.

7. The environmental air cleaning device according to claim 5, wherein
    the plurality of fold stabilization means are arranged at least at a clean air side of the one or more folded filter elements.

8. The environmental air cleaning device according to claim 5, wherein
    the plurality of fold stabilization means are arranged at a clean air side and at a raw air side of the one or more folded filter elements.

9. The environmental air cleaning device according to claim 1, wherein
    the environmental air cleaning device comprises
        two or more of the one or more folded filter elements,
        wherein the two or more folded filter elements are arranged side by side, adjacent to each other in a direction transverse to the longitudinal axis.

10. The environmental air cleaning device according claim 1, wherein the flow deflector vane is arranged at proximate to the inlet opening and connected to one or more edges of the receiving housing, selected from the group consisting of:
- a forward outer lateral edge of the receiving housing, wherein the forward outer lateral edge extends in a vertical vehicle direction;
- a forward lower edge of the receiving housing, wherein the forward lower edge extends in a transverse vehicle direction; and
- a forward upper edge of the receiving housing, wherein the forward upper edge extends in the transverse vehicle direction.

11. The environmental air cleaning device according to claim 1, further comprising
a pre- or coarse separator that is arranged upstream of the one or more folded filter elements in a flow direction of the environmental air through the environmental air cleaning device.

12. The environmental air cleaning device according to claim 11, wherein
the pre- or coarse separator is selected from the group consisting of
- a separator grid,
- a separator net,
- a baffle plate, and
- a preseparator nonwoven.

13. The environmental air cleaning device according to claim 1, further comprising
a water separator arranged upstream of the one or more filter elements in a flow direction of the environmental air through the environmental air cleaning device.

14. The environmental air cleaning device according to claim 13, wherein
the water separator comprises
one or more separator elements selected from the group consisting of
- a lamellar separator,
- a hydrophobic separator layer,
- closeable flaps, and
- closeable lamellas.

15. The environmental air cleaning device according to claim 1, further comprising
a drawer mechanism or releasable locking connections for mounting the one or more filter elements.

16. The environmental air cleaning device according to claim 1, wherein
the one or more folded filter elements comprise one or more specifications selected from the group consisting of:
- an inflow surface of at least 100 mm×250 mm;
- a volume of at least 6.5 l; and
- a net filter surface that amounts to at least 3 $m^2$.

17. The environmental air cleaning device according to claim 1, wherein
the environmental air cleaning device comprises
a pressure loss of at most 200 Pa at an inflow of the one or more filter elements with air at standard conditions at 1.5 m/s.

18. The environmental air cleaning device according to claim 1, further comprising
an air conveying device arranged within the receiving housing and configured to assist in conveying the environmental air through the environmental air cleaning device,
wherein the air conveying device comprises an electrical connecting element configured to connect to a power supply of the road vehicle.

19. A road vehicle comprising:
a vehicle roof and a vehicle-side mounting device for roof loads arranged at the vehicle roof;
the environmental air cleaning device according to claim 1.

20. The road vehicle according to claim 19, wherein
the one or more folded filter elements of the environmental air cleaning device are flowed through in a longitudinal vehicle direction and at least partially in a vertical vehicle direction.

21. The road vehicle according to claim 19, wherein
the one or more folded filter elements of the environmental air cleaning device are flowed through in a longitudinal vehicle direction.

22. The road vehicle according to claim 19, wherein
the one or more folded filter elements of the environmental air cleaning device are flowed through at least partially in a vertical vehicle direction.

23. The road vehicle according to claim 19, wherein
the environmental air cleaning device extends in a transverse vehicle direction across at least 30% of a vehicle width of the road vehicle.

\* \* \* \* \*